US006212265B1

(12) United States Patent
Duphorne

(10) Patent No.: US 6,212,265 B1
(45) Date of Patent: Apr. 3, 2001

(54) METHOD AND APPARATUS FOR ELECTRONIC MAIL NOTIFICATION

(76) Inventor: Darin Duphorne, 4849 Briarbend, Houston, TX (US) 77035

( * ) Notice: Subject to any disclaimer, the term of this patent is extended or adjusted under 35 U.S.C. 154(b) by 0 days.

(21) Appl. No.: 09/238,118

(22) Filed: Jan. 27, 1999

Related U.S. Application Data

(60) Provisional application No. 60/072,738, filed on Jan. 27, 1998, and provisional application No. 60/100,383, filed on Sep. 15, 1998.

(51) Int. Cl.[7] .............................. H04M 1/56; H04M 15/06
(52) U.S. Cl. .................. 379/142; 379/88.22; 379/88.19; 379/88.12; 379/88.11; 379/88.25; 379/93.24; 379/100.08
(58) Field of Search .......................... 379/93.35, 100.08, 379/142, 93.09, 900, 93.24, 88.12, 88.13, 88.19, 88.22, 88.23, 88.25, 88.11

(56) References Cited

U.S. PATENT DOCUMENTS

| 4,582,956 | 4/1986 | Doughty . |
| 4,935,954 | 6/1990 | Thompson et al. . |
| 5,333,181 | 7/1994 | Biggs . |
| 5,487,100 | * 1/1996 | Kane ................................ 379/93.24 |
| 5,512,935 | 4/1996 | Majeti et al. . |
| 5,590,178 | 12/1996 | Murakami et al. . |

(List continued on next page.)

OTHER PUBLICATIONS

Microlegend Telecom Systems, Inc., Microlegend SS7 Tutorial—The SS7 Protocol Stack, Jan. 9, 1998.
Microlegend Telecom Systems, Inc., Microlegend SS7 Tutorial—What Is SS7?, Jan. 10, 1999.
SS7 Signaling Review, Jun. 9, 1997.
Microlegend Telecom Systems, Inc., Microlegend SS7 Tutorial—Message Transfer Part, Jul. 31, 1997.
Slawson, Michael W., Caller ID Basics, Apr. 15, 1997.
Telephone Caller ID Specs:, Jan. 19, 1998.
Caller ID Faq, Mar. 1994.
Sandman, Mike, Message Waiting Products—Every Kind In The World!, 1995.
The International Engineering Consortium, Bell Atlantic Signaling System 7 Tutorial, 1997.

Primary Examiner—Surtis A. Kuntz
Assistant Examiner—Rexford Barnie

(57) ABSTRACT

Existing wire-line public switched telephone networks and Caller Identification ("CallerID") systems operated by local telephone companies are utilized to deliver email notification to users via the users' telephone lines. The present invention queries the user's ISP remote server to determine whether any email addressed to the user is received by and/or stored thereon and, if so, causes an associated CallerID server of, for instance, the local telephone company to send an email notification signal in a format compatible with operating CallerID protocols to an email notification device using a public switched telephone network. By transmitting email notification signals over existing telephone lines, the present invention is widely available to users and advantageously eliminates the need for users to maintain a paging or cable service and, perhaps more importantly, does not require the user to maintain an online cable connection, an online Internet connection, or a paging device. In some embodiments, email notification signals in accordance with the present invention are transmitted during telephone ringing intervals and, in other embodiments, are transmitted prior to the first telephone ringing signal. In one embodiment, an email notification signal containing at least a portion of the text of unread email received by and/or stored on the user ISP email server is transmitted to the user via the public switched telephone network.

33 Claims, 9 Drawing Sheets

U.S. PATENT DOCUMENTS

| | | | |
|---|---|---|---|
| 5,661,781 | * 8/1997 | Dejager | 379/144 |
| 5,675,507 | * 10/1997 | Bobo, II | 358/400 |
| 5,699,417 | 12/1997 | Khojasteh . | |
| 5,717,742 | * 2/1998 | Hyde-Thomson | 379/93.24 |
| 5,724,412 | * 3/1998 | Srinivasan | 379/142 |
| 5,727,047 | 3/1998 | Bentley et al. . | |
| 5,742,668 | * 4/1998 | Pepe et al. | 379/88.22 |
| 5,748,709 | * 5/1998 | Sheerin | 379/142 |
| 5,751,791 | * 5/1998 | Chen et al. | 379/88.13 |
| 5,761,312 | 6/1998 | Zelikovitz et al. . | |
| 5,802,166 | * 9/1998 | Garcai et al. | 379/142 |
| 5,841,850 | * 11/1998 | Fan | 379/142 |
| 5,850,519 | * 12/1998 | Vazanna | 395/200.36 |
| 5,870,454 | * 2/1999 | Dahlen | 379/88.13 |
| 5,907,596 | * 5/1999 | Karnowski | 379/142 |
| 5,915,000 | * 6/1999 | Nguyen et al. | 379/142 |
| 5,930,350 | * 7/1999 | Johnson | 379/93.24 |
| 5,933,477 | * 8/1999 | Wu | 379/88.26 |
| 5,937,161 | * 8/1999 | Mulligan et al. | 379/93.24 |
| 5,943,398 | * 8/1999 | Klein et al. | 379/88.13 |
| 5,944,786 | * 8/1999 | Quinn | 379/88.13 |
| 5,963,618 | * 10/1999 | Porter | 379/88.17 |
| 5,963,626 | * 10/1999 | Nabkel | 379/142 |
| 5,966,351 | * 10/1999 | Carleton et al. | 379/88.22 |
| 5,987,100 | * 11/1999 | Fortman et al. | 379/88.14 |
| 5,987,508 | * 11/1999 | Agraharam et al. | 379/93.24 |
| 5,995,594 | * 11/1999 | Shaffer et al. | 379/88.18 |
| 5,995,597 | * 11/1999 | Woltz et al. | 379/88.15 |
| 5,999,595 | * 12/1999 | Shaffer et al. | 379/88.22 |
| 6,002,751 | * 12/1999 | Shaffer | 379/88.18 |
| 6,014,427 | * 1/2000 | Hanson et al. | 379/88.18 |
| 6,018,577 | * 1/2000 | Roach, Jr. | 379/142 |

\* cited by examiner

| | | |
|---|---|---|
| 30a — | S: | +OK  X1  NT-POP3 Server mail.server.com (Imail 4.04 424216-1) |
| 30b — | C: | USER BobJones |
| 30c — | S: | +OK welcome |
| 30d — | C: | PASS fooBAR |
| 30e — | S: | +OK maildrop locked and ready |
| 30f — | C: | STAT |
| 30g — | S: | +OK 2 4771 |
| 30h — | C: | TOP 1 3 |
| | S: | +OK 2849 octets |
| | S: | Received: from test.otherserver.com[209.128.123.105] by mail.server.com |
| | S: |     (SMTPD32-4.04) id AE7C4D0200EE; Tue. 21 Jul 1998 14:39:40 CDT |
| | S: | Received from btinternet.com by test.otherserver.com with SMTP; Tue. 21 |
| | S: |     Jul 1998 14:41:45 –0500 |
| | S: | Message-ID: 002201bdb49L$51e05ce0$0112c8c2@inetsrv |
| | S: | Reply-To: "BillyBob" BillyBob@test.otherserver.com |
| 30i — | S: | From: "BillyBob" BillyBob@test.otherserver.com |
| | S: | Subject: Test message #1 |
| | S: | Date: Tue, 21 Jul 1998 13:01:39 +0100 |
| | S: | MIME-Bersion: 1.0 |
| | S: | Content-Type: text/plain;    charset="iso-8859-1" |
| | S: | Content-Transfer-Encoding: 7bit |
| | S: | X-Priority: 3 |
| | S: | X-MSMail-Priority: Normal |
| | S: | X-Mailer: Microsoft Outlook Express 4.72.3110.5 |
| | S: | X-MimeOLE: Produced By Microsoft MimeOLE V4.72.3110.3 |
| | S: | Sender: BillyBob@test.otherserver.com |
| | S: | Precedence: Bulk |
| | S: | X-UIDL: 3907 |
| | S: | Status: U |
| | S: | |
| | S: | This is line 1 of testmessage #1. |
| 30j — | S: | This is line 2 of testmessage #1 |
| | S: | This is line 3 of testmessage #1 |
| | S: | |

*Fig. 3a*

30h — C: TOP 2 3
S: +OK 1922 octets
S: Received: from test.otherserver.com[209.128.123.105] by mail.server.com
S:    (SMTPD32-4.04) id AE7C4D0200EE; Tue. 21 Jul 1998 14:39:40 CDT
S: Received from btinternet.com by test.otherserver.com with SMTP; Tue. 21
S:    Jul 1998 14:41:45 −0500
S: Message-ID: <199807211955.VAA15118@front3.grolier.fr>
S: Subject: Test Message #2
30i — S: Date: Mar, 21 Jul 98 21:58:12 +0200
S: x-sender: brunelc@mail.club-internet.fr
S: x-maile: Claris Emailer 1.1
S: From: SallyMae SallyMae@test.differentserver.com
S: To: "BobJones" BobJones@mail.server.com
S: Mime-Version: 1.0
S: Content-Type: text/plain; charset="US=ASCII"
S: Reply-To: "BillyBob" SallyMae <SallyMae@test.differentserver.com>
S: Sender: SallyMae@test.differentserver.com
S: Precedence: Bulk
S: List-Software: LetterRip Pro 3.0 by Fog City Software, Inc. X-UIDL:3908
S: Status U
S:
S: This is line 1 of testmessage #2
30j — S: This is line 2 of testmessage #2
S: This is line 3 of testmessage #2
S:
30k — C: QUIT
S: +OK POP3 Server saying Good-Bye

*Fig. 3b*

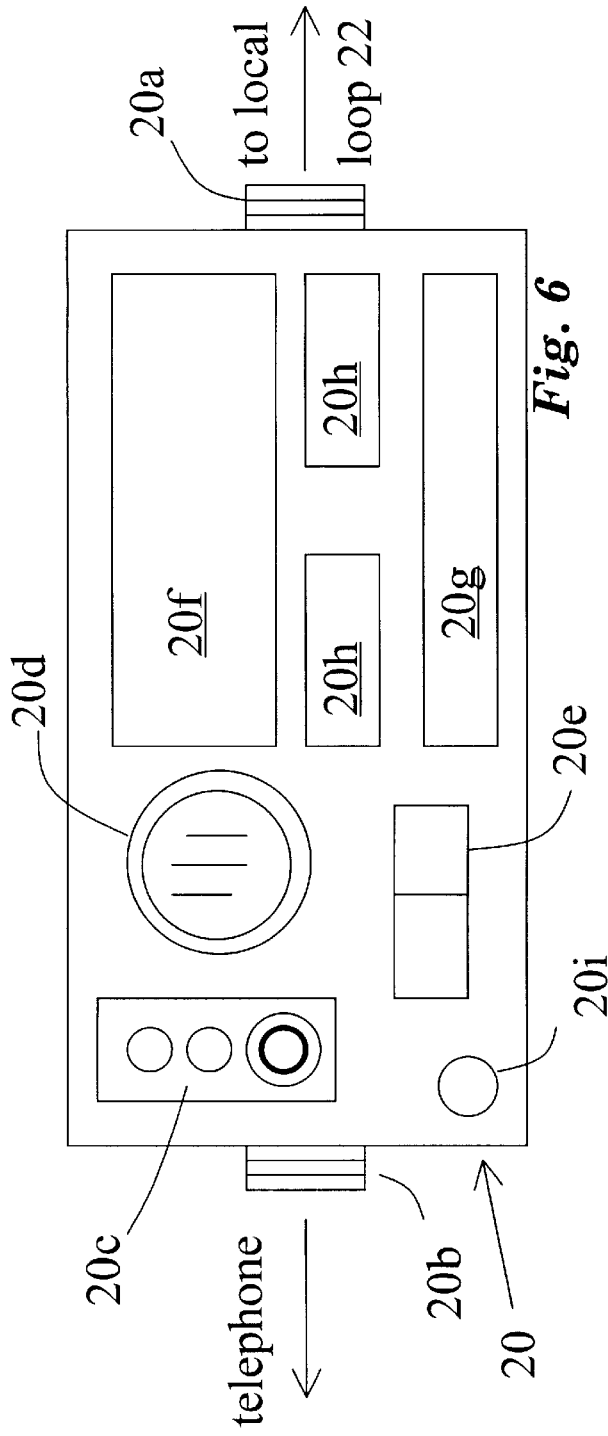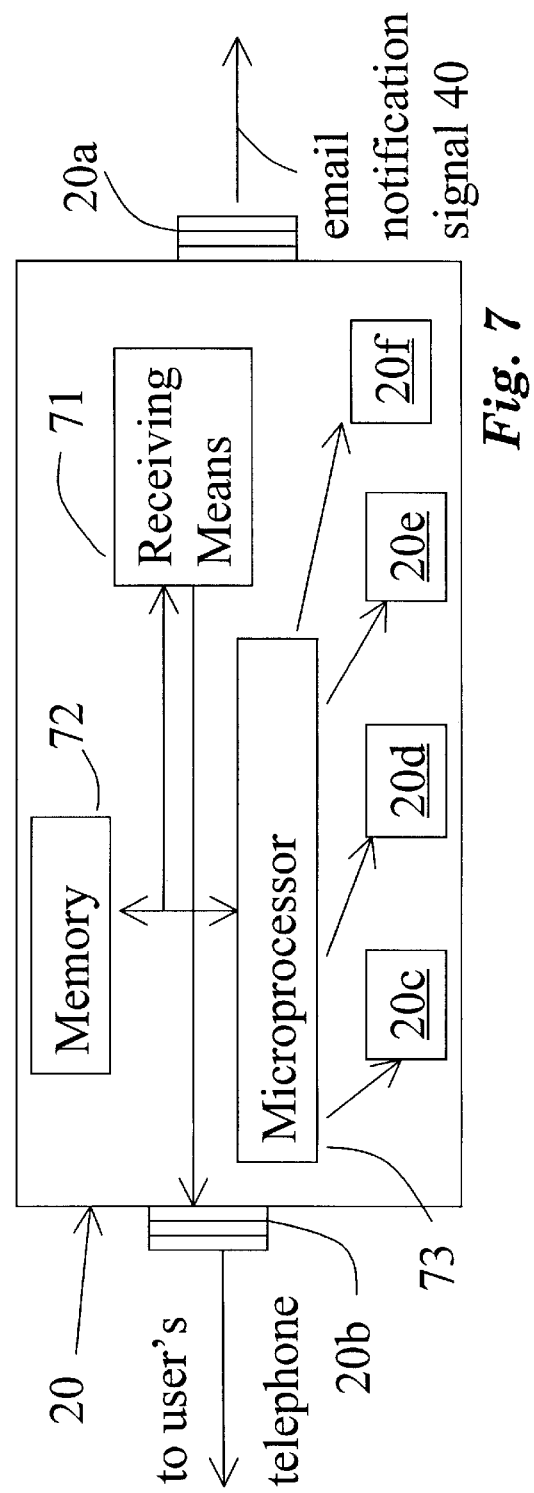

METHOD AND APPARATUS FOR ELECTRONIC MAIL NOTIFICATION

RELATED APPLICATIONS

This application claims the benefit of U.S. Provisional Application Nos. 60/072,738, filed Jan. 27, 1998, and 60/100,383. filed Sep. 15, 1998.

BACKGROUND

1. Field of the Invention

The present invention relates generally to electronic mail and specifically to passive notification of electronic mail reception.

2. Description of Related Art

Electronic mail ("email") is delivered between users via the Internet and is available from most Internet Service Providers ("ISPs"). Email addressed to a particular user is sent to and stored on a remote email server operated by the recipient user's ISP. Typically, the user must query the ISP email server in order to determine whether email has been sent to a user. Querying the ISP email server, as well as delivery of email from the ISP email server for viewing, requires an online connection between the user's computer and the remote server. Accordingly, in order for a user to achieve prompt and effective delivery of email received from other users, the user must maintain a continual online connection and frequently query the ISP email server while, of course, maintaining power to the user's computer and continually operating appropriate email query software.

Recently, several systems have been developed to alert users of email received from other users and stored on the user's ISP remote server without requiring a continuous online connection to the Internet. In one system, conventional broadcast pager networks are employed to deliver a paging signal to a user's pager or other suitable broadcast reception device when email addressed to the user is received at the user's ISP remote server. This system, however, requires the user to purchase a paging device, purchase and maintain a paging service, and requires the user to keep the paging device turned on and in close proximity to the user. Further, effectiveness of this "email pager notification" system undesirably depends upon the availability, coverage area, and operating status of local paging networks, as well as upon the operating status of the user's pager device. In another system, a notification system is configured for use with a standard computer modem and a user's computer and television to transmit a notification signal directly to the user's computer by standard dial-up modem connection, or indirectly as a video image to the user's television through the user's computer when the user does not respond to the notification signal provided initially to the computer. However, this system requires the user to keep the computer turned on and requires a standard telephone connection via the associated modem to provide the notification signal to the user's computer. Further, since conventional televisions and cable converter boxes do not have writeable memory, if the user's computer and television are not turned on when the notification signal is transmitted, the user is not notified.

Use of the Internet and related email services is rapidly increasing as a quick, inexpensive, and reliable form of global communication. Indeed, with common applications ranging from intra-office and inter-office communication to online purchase verification to news and event updates, email is a well accepted and widely used form of communication. As a result, users are increasingly desirous of fast, inexpensive, and reliable email notification. As discussed above, conventional email notification systems require additional service subscriptions which are not always available and not always desired by a user, e.g., those requiring an online connection or a paging network service. Further, such systems cannot continuously and passively notify a user as to reception of email addressed to the user without the user's paging device or computer and/or television remaining on. Accordingly, there is a need for a continuous and passive email notification system which is readily available to all users and which does not require the user to maintain an online connection or leave a pager device or cable television system turned on.

SUMMARY

In accordance with the present invention, existing wireline public switched telephone networks and Caller Identification ("CallerID") systems operated by local telephone companies are utilized to deliver email notification to users via the users' telephone lines. The present invention queries the user's ISP email server to determine whether any email addressed to the user is received by and/or stored thereon and, if so, causes an associated CallerID server of, for instance, the local telephone company to send an email notification signal in a format compatible with existing CallerID protocols to an email notification device using a public switched telephone network. By transmitting email notification signals over existing telephone lines, the present invention is widely available to users and advantageously eliminates the need for users to maintain a paging or cable service and, perhaps more importantly, does not require the user to maintain an online cable connection, an online Internet connection, or a paging device. In some embodiments, email notification signals in accordance with the present invention are transmitted during telephone ringing intervals and, in other embodiments, are transmitted prior to the first telephone ringing signal. In one embodiment, an email notification signal containing at least a portion of the text of unread email received by and/or stored on the user's ISP email server is transmitted to the user via the public switched telephone network.

BRIEF DESCRIPTION OF THE DRAWINGS

FIG. 3 is a transcript of an online communication illustrating transmission of a preliminary email notification signal in accordance with the present invention;

FIG. 6 is a front plan view of an email notification device in accordance with the present invention;

FIG. 7 is a schematic diagram of the email notification device of FIG. 6;

Like reference numerals refer to corresponding parts throughout the drawing figures.

DETAILED DESCRIPTION

Embodiments of the present invention are discussed below in the context of a conventional public switched telephone network ("PSTN"), CallerID server, and CallerID protocols for simplicity only. It is to be understood that embodiments of the present invention are equally applicable to modified PSTN, CallerID server, and/or CallerID protocols. Accordingly, the present invention is not to be construed as limited to specific examples described herein but rather includes within its scope all embodiments defined by the appended claims.

Figure 1:
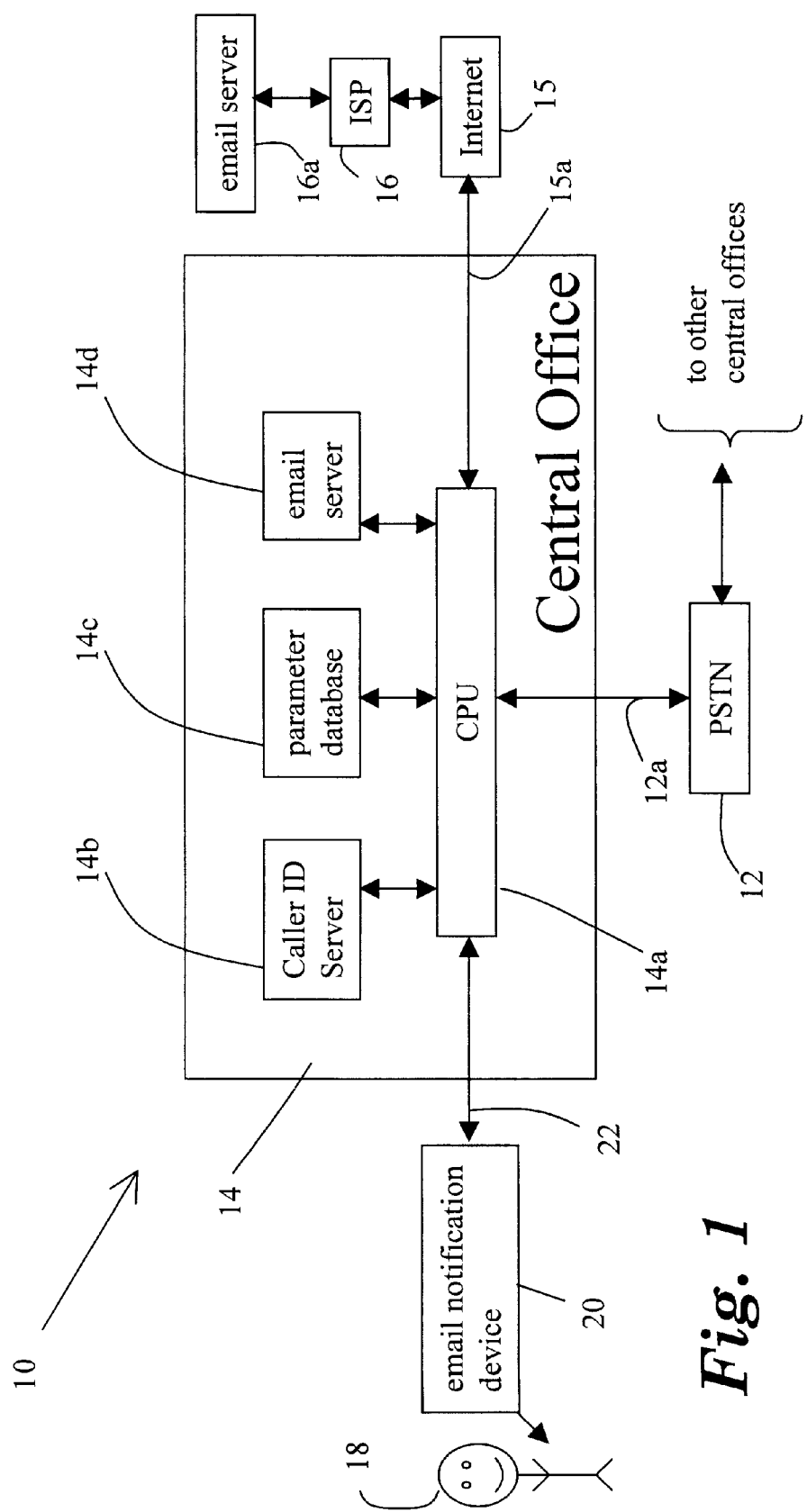
FIG. 1 is a block diagram of an email notification system in accordance with the present invention.

Referring to FIG. 1, an email notification system 10 in accordance with the present invention includes a PSTN 12 to which are connected one or more central offices 14 via suitable bidirectional bus structure 12a (only one central office 14 is shown for simplicity). The central office 14, which is operated by the local telephone company ("telco"), includes a central processing unit ("CPU") 14a such as, for instance, a microprocessor, and has associated therewith a CallerID server 14b, a user notification parameter database 14c, and in some embodiments an email server 14d. The CallerID server 14b and email server 14d are well known in the art and are therefore not discussed in detail herein. In some embodiments, function performed by the CallerID server 14b and email server 14d and the user notification paramater database 14c may be integrated into a single server (not shown) or other combinations and may be operated by either the central office 14. The central office 14 is coupled to the Internet 15 via a suitable bus bidirectional bus 15a. ISPs 16, each of which includes an email server 16a, are connected to the Internet 15 via a suitable bidirectional bus structure 15b (only one ISP 16 is shown for simplicity). The ISP email server 16a is preferably a well known POP3 email server. The central office 14 is coupled to a user 18's email notification device 20 via the user 18's local loop telephone line 22. In some embodiments, the local loop 22 may be maintained by the local telco and may form part of the PSTN 12. In other embodiments, the local loop 22 may be operated by the user 18 such as, for instance, where the user 18 operates its own private branch exchange ("PBX").

CallerID uses well known protocols for transmitting alphanumeric data from the calling party's associated central office (not shown in FIG. 1) to the called party's central office 14 via the PSTN 12, and thereafter from the central office 14 to a CallerID-compatible device, e.g., email notification device 20, associated with the user 18. Some CallerID protocols allow for the transmission of alphanumeric data during the silent interval between successive ringing intervals of the called party's telephone, while others allow for alphanumeric data transmission using reverse polarity line reversal without causing ringing of the called party's telephone.

When an email message addressed to the user 18 is sent by another user, it travels across the Internet 15 and is received by and/or stored on an email server associated with the user 18's email service. For purposes of discussion herein, the user 18's email service is provided by the ISP 16 and, therefore, email addressed to the user 18 is received by and/or stored on the ISP email server 16a. Here, it is noted that in some embodiments the local telco provides user 18's email service, in which case email addressed to the user 18 is received by and/or stored on the email server 14d. In preferred embodiments, suitable and well known email query software operating, for instance, on the central office CPU 14a, periodically queries the ISP email server 16a via the Internet 15 to determine whether email addressed to the user 18 has been received by and/or stored on the ISP email server 16a. In response thereto, the ISP email server 16a transmits a preliminary email notification signal to the central office 14. In some embodiments, the ISP email server 16a automatically transmits the preliminary email notification signal to the central office when email addressed to the user 18 is received by the ISP email server 16a. Note that in some embodiments the email query software is operated by the ISP 16 or other suitable service provider. For instance, in those embodiments in which the local telco provides email service to the user, email is received by the telco email server 14d and, therefore, the preliminary email notification signal may be routed within the central office 14 to arrive at the CallerID server 14b in any suitable manner. Once received by the central office 14, the preliminary email notification signal is formatted into a CallerID-compatible email notification signal and then transmitted to the user 18's email notification device 20 via the local loop 22. The email notification signal activates an alert indicating means of the email notification device 20 to alert the user 18 that email addressed to the user 18 has been received by the ISP email server 16a. In some embodiments, the email notification signal provides additional information for viewing by the user 18 via the email notification device 20, as discussed more fully below.

The user notification parameter database 14c stores information relative to the user's 18 email service which, as described herein with reference to FIG. 1, is provided by the ISP 16. Preferably, each user whom subscribes to an email notification service in accordance with the present invention has assigned thereto a line entry in the user notification parameter database 14b containing the user's ISP email server Internet address, the user's username and password, and other control information such as, for instance, parameter values indicating whether the above-mentioned query software is to query the user's ISP email server, the frequency with which the user's ISP email server is queried, preferred email notification signal format, spam filtering information, and/or other filtering information such as, for instance, particular usernames and/or domain names from which the user does not wish to receive email notification.

Figure 2:
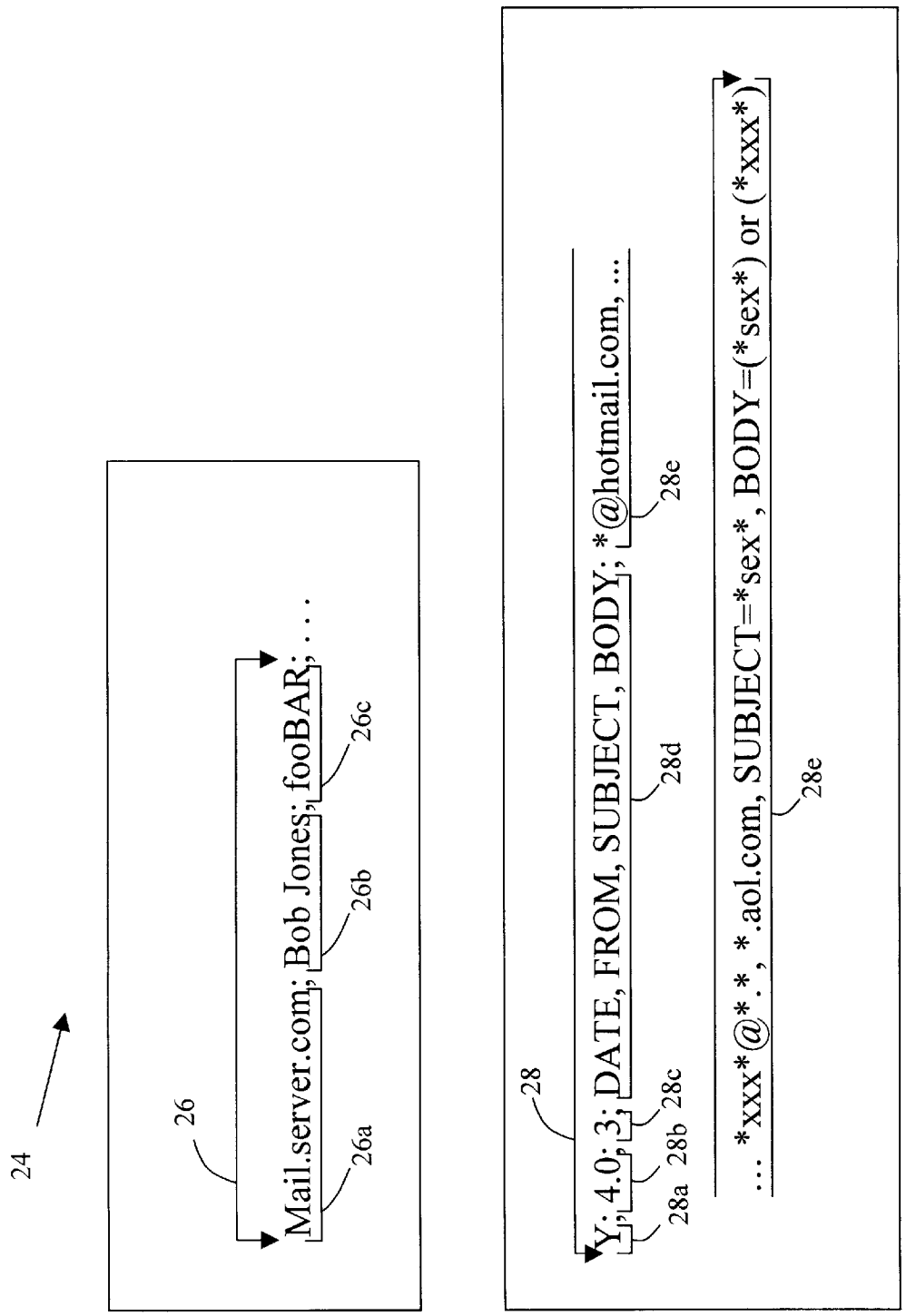
FIG. 2 is a representation of a line entry in a user notification parameter database in accordance with the present invention.

For example, FIG. 2 shows a line entry 24 in the user notification parameter database 14b which corresponds to the user 18, as used in one embodiment of the present invention. The line entry 24 includes authentication fields 26a–26c for storing the user 18's email service authentication information and preference fields 28a–28d for storing the user 18's preference parameters. The address field 26a stores the Internet address of the ISP email server 16a, e.g, "mail.server.com", the username field 26b stores the user 18's username, e.g., "BobJones", and the password field 26c stores the user 18's email password, e.g., "fooBAR". The query initiate field 28a indicates whether the above-mentioned query software queries the ISP email server 16a, e.g., "Y"; the query frequency field 28b indicates the frequency with which the ISP email server 16a is queried, e.g., "4.0" hours; the text line field 28c indicates the number of text lines of each email message is to be included in the email notification signal; the message preference field 28d indicates the identity and desired transmission order of email header information, e.g., "Date, Time, Subject, Message";

and the filtering field 28e indicates those email sources from which the user 18 does not desire email notification in accordance with the present invention, e.g, email from "aol.com", email having a subject including the term "sex", and/or email messages that include either of the words "sex" and "xxx". In other embodiments, additional fields may be added as desired.

As mentioned above, preferred embodiments utilize email query software for monitoring reception of email at the user's email server. This query software, which is of well known design, may be provided and maintained by either the central office 14, the ISP email server 16a, or some other suitable service provider. In order to query the ISP email server 16a, the query software accesses the user notification parameter database 14c to retrieve the line entry 24 which corresponds with the user 18. Note that in those embodiments where the query software is resident on and operated by the ISP 16, the user notification parameter database 14c may also be resident on and operated by the ISP 16. In any event, if the corresponding email query field 28a of the corresponding line entry 24 contains a yes value, as indicated by the "Y" in FIG. 2, the email query software initiates a transport control protocol/Internet protocol ("TCP/IP") connection with the ISP email server 16a according to the query frequency parameter stored in the user notification parameter database. Of course, in those embodiments where the query software and email server are operated by the same entity, e.g., the central office 14, this TCP/IP connection is not necessary, and other more suitable communication techniques are employed, e.g., file monitoring, inter-application messaging, or existing network connections using well-known protocols other than TCP/IP. Referring also to FIG. 3, which depicts a transcription of an online connection between the central office 14 and the ISP email server 16a, the query software initiates this online connection with the ISP email server 16a by transmitting the command "+OK" to the ISP email server 16a's Internet address which, as mentioned above, is stored in the Internet address field 26a of the line entry 24 (see also FIG. 2). In FIG. 3, commands transmitted by the query software are preceded by "C:", and responses transmitted by the ISP email server 16a are preceded by "S:". The ISP email server 16a monitors the appropriate input port, i.e., TCP port 110, for such connection initiations and, in response thereto, transmits a greeting signal to the central office 14, as indicated in line 30a of FIG. 3. The query software then transmits to the ISP email server 16a the username extracted from the corresponding username field 26b, i.e., "BobJones", as indicated in line 30b of FIG. 3. After receiving an appropriate acknowledgment, as indicated in line 30c of FIG. 3, the query software transmits to the ISP email server 16a the password extracted from the corresponding password field 26c, i.e., "fooBAR", as indicated in line 30d. After receiving appropriate acknowledgment, as indicated in line 30e of FIG. 3, the query software transmits a status command STAT, as indicated in line 30f of FIG. 3. In response thereto, the ISP email server 16a transmits values indicating the number of email messages waiting on the ISP email server 16a and the amount of memory occupied by such email messages, as indicated by line 30g. The query software then iteratively issues a TOP command followed by an iteration number representing the message number to be read during each iteration and the number of text lines of each email to be delivered, respectively, as indicated in line 30h of FIG. 3. In response to each iteration of the TOP command, the ISP email server 16a forwards a preliminary email notification signal to the central office 14. As shown in the transcript of FIG. 3, the preliminary email notification signal includes message header information 30i followed by a predetermined number of text lines 30j. In preferred embodiments, the preliminary email notification signal is temporarily stored in a suitable buffer or other memory device accessible by the query software and includes error detection means such as, for instance, a checksum value. The query software terminates the online connection by transmitting a quit command QUIT, as indicated in line 30k of FIG. 3.

Figure 4:
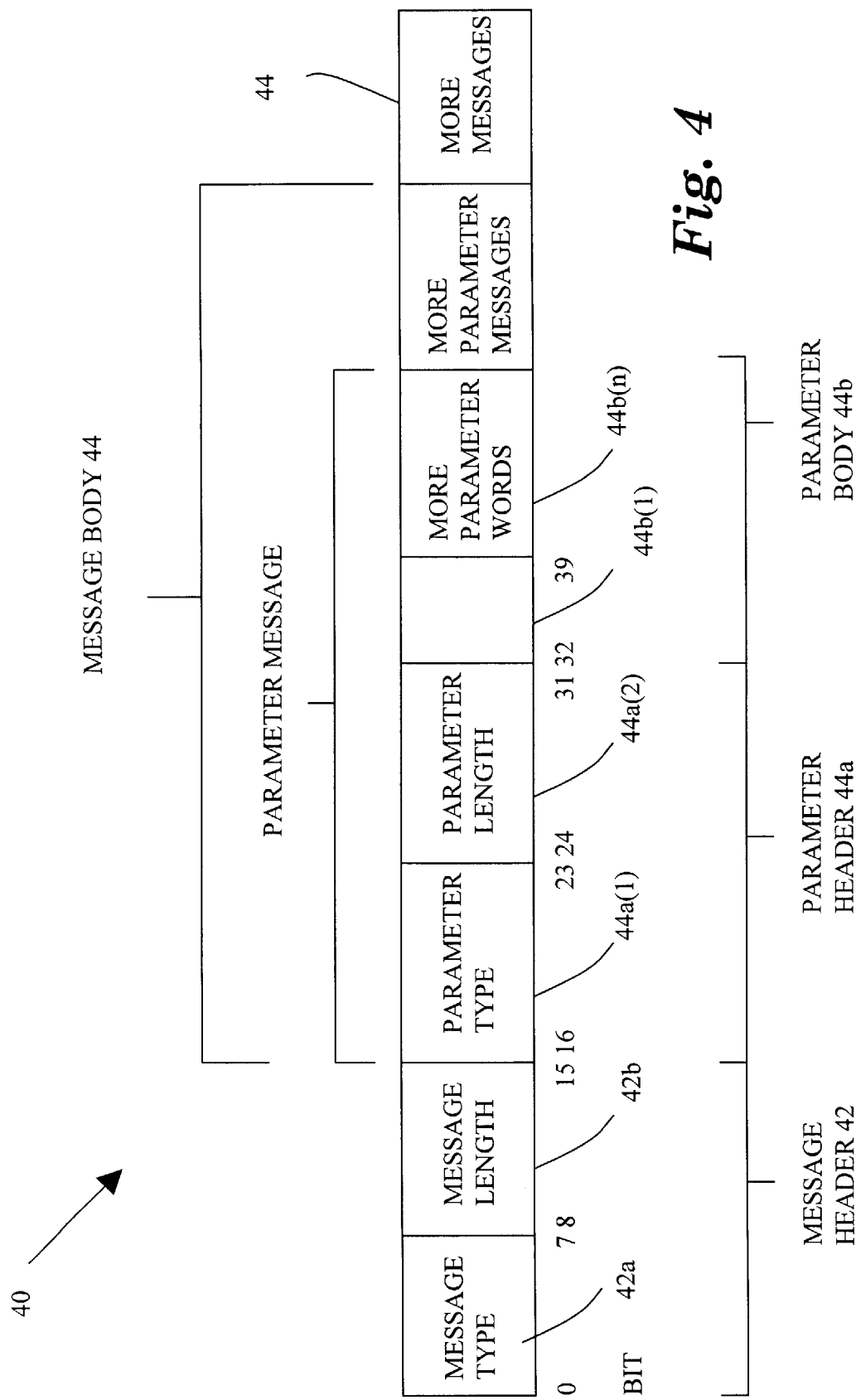
FIG. 4 is a representation of an email notification signal in accordance with one embodiment of the present invention.

The query software filters the information received from the preliminary email notification signal according to the parameter field values 28 stored in the corresponding line entry 24 of the user notification parameter database 14c, and then formats the resulting information into a CallerID-compatible email notification signal. The CallerID server 14b routes the CallerID-compatible email notification signal from the central office 14 to the user 18's email notification device 20 according to well known CallerID protocols. FIG. 4 illustrates formatting of the email notification signal in accordance with one embodiment of the present invention. Here, an email notification signal 40 is shown as including a message header 42 followed by a plurality of message bodies 44, where each message body corresponds to an email message addressed to the user 18. The message header 42 includes a message type field 42a for storing information indicating whether the present signal is an email notification signal, and includes a message length field 42b for storing information indicative of the number of bytes transmitted. Each message body 44 includes one or more parameter messages, each which includes a parameter header 44a having a parameter type field 44a(1) and a parameter length field 44a(2), and one or more parameter bodies 44b having one or more parameter word fields 44b(1)–44b(n). The parameter type field 44a(1) contains commands pertaining to the email notification information in the corresponding message body 44 such as, for instance, whether to add or remove email notification information on the addressed email notification device 20. The parameter length field 44a(2) indicates the number of additional parameter words 44b(1)–44b(n) that are in the email notification signal 40. Of course, in ether embodiments, additional information and parameter fields may be added to (or some removed from) the email notification signal 40 as particular applications require. After formatted as described above, the email notification signal 40 is transmitted to the user 18's email notification device 20 according to CallerID protocols via the local loop 22 connected to a situs associated with the user 18, e.g., home, office, etc. In some embodiments, the email notification signal 40 is a frequency shift keyed ("FSK") signal, as is well known in the art, while in other embodiments the email notification signal 40 is a dual tone multi-frequency "DTMF") signal. U.S. Pat. No. 5,699,417 describes the use of DTMF signals to transmit alphanumeric information, and is incorporated by reference herein.

Figures 5, 8:
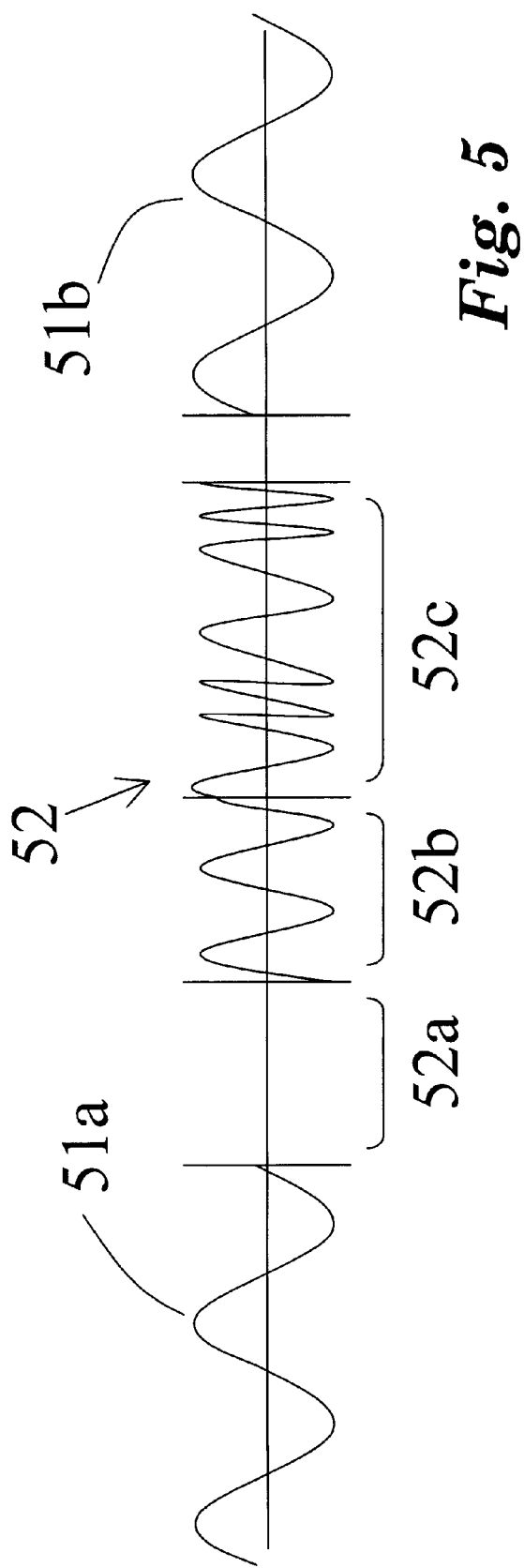
FIG. 5 is a sample waveform of an email notification signal in accordance with the present invention.
FIG. 8 is a sample message format of the email notification signal of FIG. 5.
Figure 9:
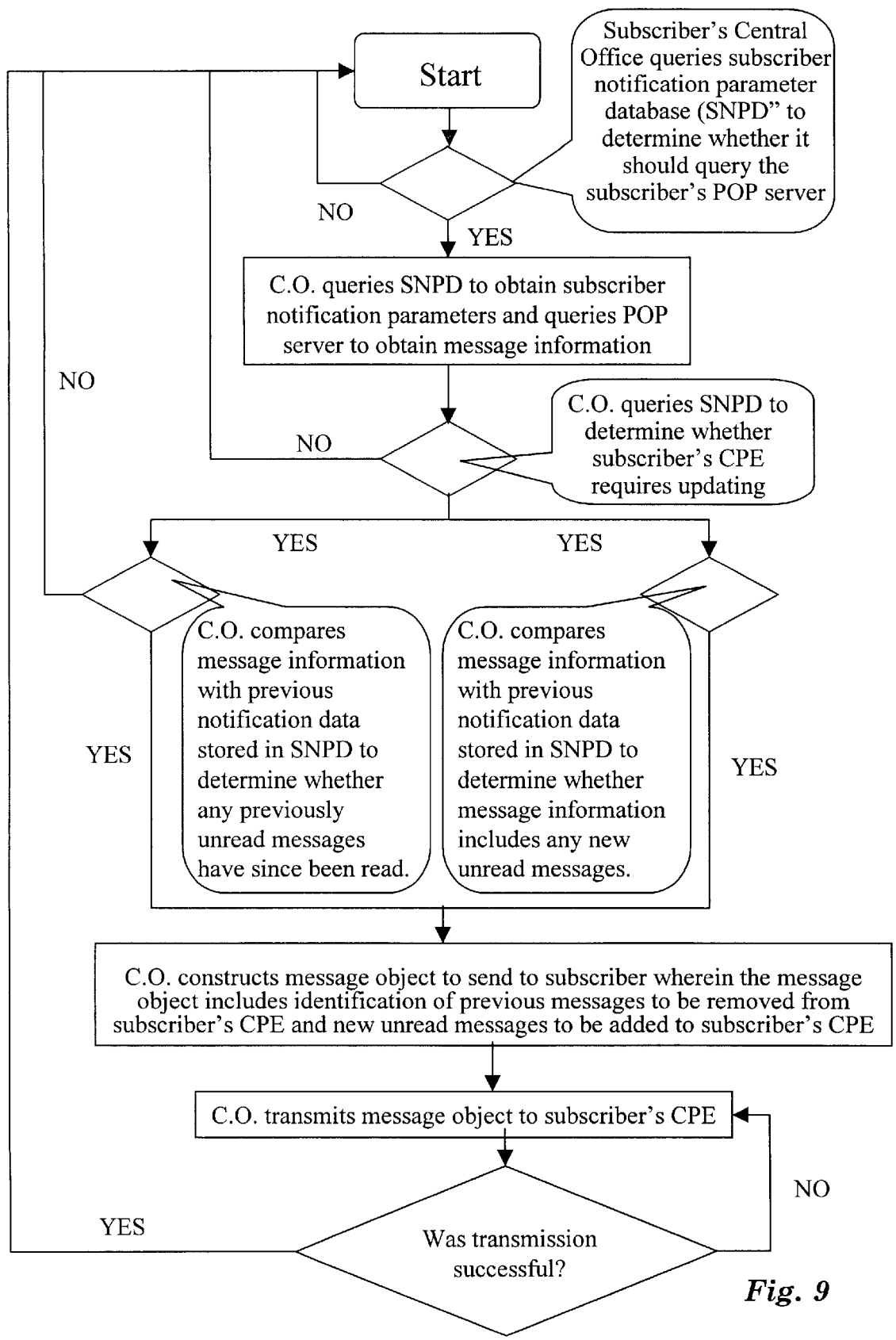
FIG. 9 is a schematic diagram of an email notification method in accordance with the present invention.
Figure 10:
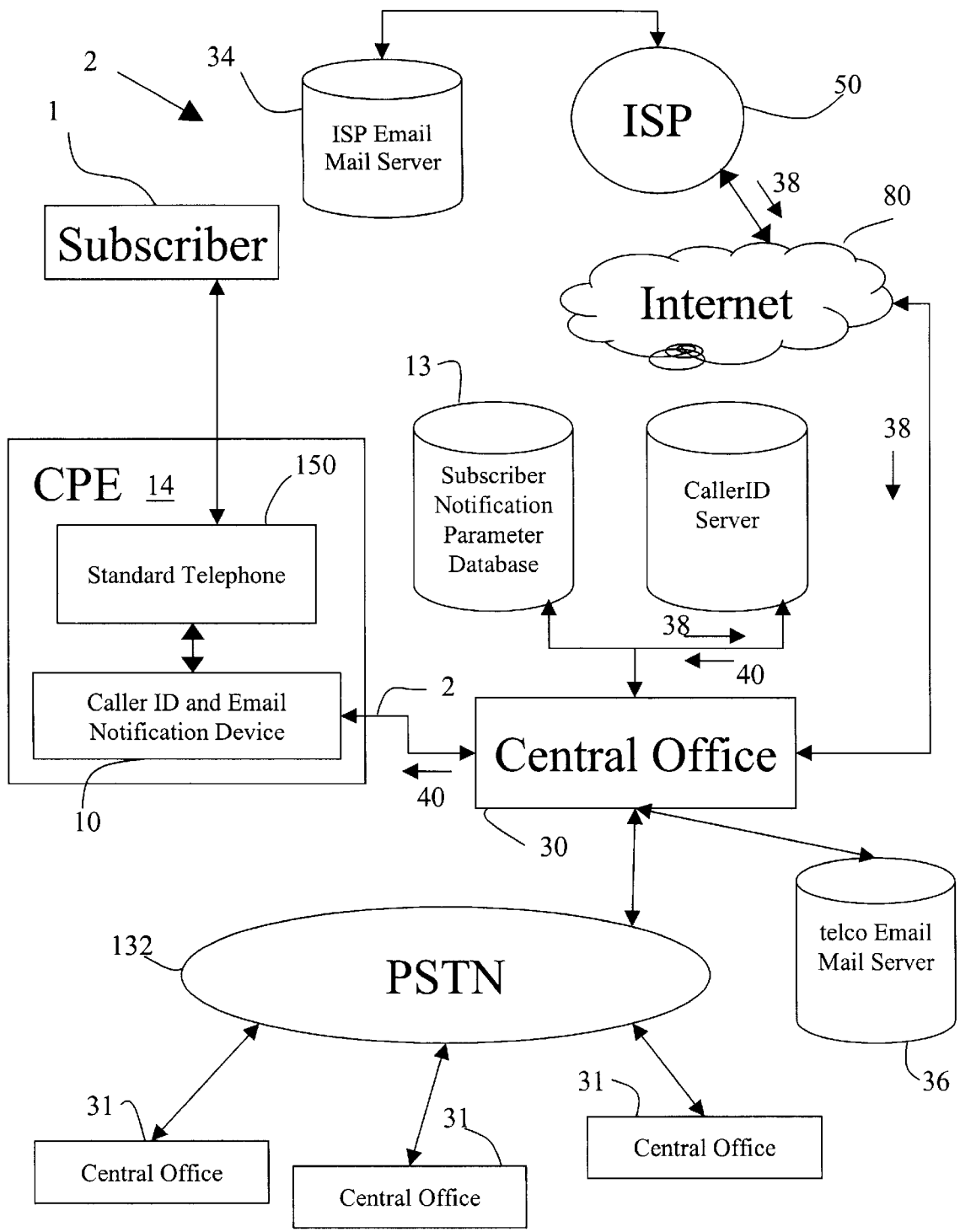
FIG. 10 is a block diagram of an email notification system in accordance with the present invention.

The signal waveforms shown in FIG. 5 represent successive ringing signals 51a and 51b and an intermittent silent interval 52 typically used for initiating a telephone call via the central office 14 to the user 18 via the local loop 22. The ringing signals 51 each have a duration of approximately 2 seconds, and the silent interval 52 has a duration of approximately 4 seconds. In preferred embodiments, the email notification signal 40 is transmitted from the central office 14 to the email notification device 20 during the silent interval 52 as a frequency shift keyed (FSK) signal having, for instance, two carrier frequencies 2025 Hz and 2225 Hz to represent the low ("0") and high ("1") logic levels, respectively, of information contained therein. In some embodiments, this FSK email notification signal 40 is received by the email notification device 20 in a balanced manner on the tip and ring leads (not shown) of the email notification device 20. A first portion 52a of the silent interval 52 is used to the email notification device 20 to achieve a steady state condition. A single FSK signal is transmitted to the tip and ring leads (not shown) of the input terminal 20a during a second portion 52b of the silent interval 52 to initialize the email notification device 20. The email notification signal 40 is transmitted during a third portion 52c of the silent interval 52.

Referring to FIG. 6, the email notification device 20, configured to receive the email notification signal 40 transmitted from the central office 14 and preferably housed in a small, non-obtrusive structure, includes an input terminal 20a coupled to a standard RJ11 connector or other suitable connector which receives signals from the user 18's local loop 22, and further includes an output terminal 20b for coupling to the line terminal of a conventional telephone (not shown). In some embodiments, the email notification device 20 includes or may be used in connection with a conventional telephone device (not shown). The email notification device 20 further includes an alert indicating means which activates upon receipt of the email notification signal 40 so as to inform the user 18 that email addressed to the user 18 has been received at the ISP email server 16a. Thereafter, the user 18 may access, retrieve, and/or view email messages information corresponding to email received by and/or stored on the ISP server 16a by logging into the ISP email server 16a using, for instance, a personal computer (not shown). In this manner, the present invention continually monitors the user 18's ISP email server 16a and, in response to any email messages received thereon, alerts the user 18 by transmitting an email notification signal over the local telephone lines. As a result, the present invention is able to provide continuous, un-interrupted email notification without requiring the user 18 to continually maintain an expensive and/or inconvenient network connection not readily available in all locations. Thus, since telephone service is readily available to nearly every domestic household, implementation of present embodiments is widely available. In contrast, pager networks and cable service have more limited coverage and service area, respectively. Further, while it is desirable to maintain the user 18's telephone service continuously, maintaining a continuous online connection, paging device, or online cable connection may be cumbersome and/or expensive.

In a preferred embodiment the email notification device 20 includes a speaker 20c and a light-emitting means 20d for providing suitable audible and visual alerts, respectively, in response to received email notification signals 40, and also includes a first display means 20e for indicating the number of email messages waiting on the ISP email server 16a, a second display means 20f for displaying alphanumeric information received from the email notification signal 40, and a printing means 20g for printing such alphanumeric information. The first and second display means 20e and 20f are each a multi-segment LED, liquid crystal display, or other suitable display, and the printing means 54 is a suitable thermal, laser, impact, or other well known printer. Scrolling buttons 20h allow the user 18 to scroll through information displayed on the second display means 20f, and a reset button 20i allows the user 18 to clear the alert indicating means and display means 20e and 20f and/or selectively email message information received from the email notification signal 40. In some embodiments, the email notification device 20 includes a modem for coupling to a computer which, in turn, may be configured to power-up and/or initiate an online connection with the ISP email server 16a in a well known manner to retrieve email messages stored thereon. Further, in some embodiments, the email notification signal 40 is simultaneously transmitted to more than one email notification device 20, e.g., to a work location and a home location.

Email notification signals 40 appearing at the input terminal 20a of the email notification device 20 are routed to a signal receiving means 61, as shown in FIG. 7. In preferred embodiments, the signal receiving means 71 includes a well known filter and signal splitting circuit (not shown for simplicity) which allows standard telephone signals to pass unmodified through the email notification device 20 and appear at the output terminal 20b for coupling to a telephone device (not shown), while simultaneously routing CallerID-compatible signals such as, for instance, the email notification signal 40, to a suitable memory 72 and microprocessor 73. The processor 73 extracts information from the message header 42 of the email notification signal and, in response thereto, selectively activates the alert indicating means 20b and/or 20c, and in some embodiments forwards a value indicative of the number of email messages received at the ISP email server 16a to the first display means 20e. In preferred embodiments, the microprocessor forwards email header information 30i (see also FIGS. 2 and 3) formatted within the email notification signal 40 to the second display means 20f. In this manner, the user 18 may view user-selected information pertaining to email received by the ISP email server 16a such as, for instance, the email time/date, the sender's username and email address, the message subject, and/or a predetermined number of text lines from each email message. In some embodiments, the microprocessor 71 forwards a value indicative of the message iteration to the first display means 20e as the user 18 scrolls through email messages displayed on the second display means 20f. It is to be noted that present embodiments are easily adapted to work in connection with a conventional CallerID device such as, for instance, that available from CIDCO Incorporated of Morgan Hill, Calif., after reading this disclosure.

In other embodiments, the email notification information extracted from the ISP email server 16a, shown for instance in the transcript of FIG. 3, is formatted into a CallerID-compatible signal 40 having a plurality of 8-bit words, as shown in FIG. 8. The first 8-bit word 81 indicates the message type of the signal 40, e.g., whether the signal 40 is an email notification signal. The second word 82 indicates the number of subsequent data words 83 contained in the signal 40, and is followed by a checksum word 84. The data words 83 contain email notification information extracted by the query software from the ISP email server 16a, e.g., the number of email messages on the ISP email server, email message header information such time/date, sender username and address, message subject, etc., according to parameter field values stored in a corresponding line entry 24 of the user notification parameter database 14c. The checksum character 84 is, for instance, the two's complement of the modulo total number of words within the transmission, and is used in a well known manner to ensure that all words transmitted from the central office 14 are received by the email notification device 20.

In some embodiments, the email notification signal 20 includes a special parameter word providing to the user 18 information unrelated to email notification. In such embodiments, the above-described query software is configured to provide the user 18 with user-selected, specialized information at predetermined times and/or with predetermined frequency, as directed by corresponding special parameter fields of the line entry 24 stored the user notification parameter database 14c (see FIGS. 1 and 2). Here, the query software formats a CallerID-compatible signal as described above, whereby this specialized information is contained within the parameter words 44. In one embodiment the user notification parameter database 14c contains information indicative of predetermined times and/or dates the user 18 has selected such as, for instance, a friend's birthday or important business meeting. In response thereto, the query software formats and sends a CallerID-compatible signal to the email notification device 20 at the designated time and/or on the designated date so as to remind the user 18 of the designated event. In another embodiment, the query software sends a CallerID-compatible signal to the email notification device 20 when a Web Site designated by the user 18 and whose Internet address is stored in a special word in a corresponding line entry 24 of the user notification database 14c when content of the Web Site is modified. In still other embodiments, the query software accesses and transmits to the email notification device 20 user specified update information such as, for instance, recent stock market quotes, or when a particular stock prices passes a user selected threshold level, as indicated by corresponding parameter words stored in the user notification database 14c. Well known monitoring software suitable for such purposes may either be integrated into the above-described query software or be independently operated by the central office 14 or ISP 16 in connection with the user notification parameter database 14c.

In still other embodiments, service venders utilize present embodiments to transmit information to the user 18 via the email notification device 20. For instance, service venders such as utilities and banks format predetermined information, e.g., bill reminders and/or other pertinent information relating to their service, and online purchase confirmations, into a CallerID-compatible signal as described above. In yet another embodiment, the email notification device 20 is used by restaurants to receive food orders sent by a customer via email and received by the restaurant over the telephone line via present embodiments. In this manner, the restaurant or other suitable vender is able to maintain an online "presence" and receive online food orders without having to maintain a conventional online connection, since such food orders are transmitted to the restaurant over existing telephone lines. In such embodiments, the email notification device 20 may be configured to print specified information using the printing means 20g. In another embodiment, the email notification device 20 is coupled to one or more compatible peripheral devices such as, for instance, a stock market ticker device, where commands to operate such devices and/or information to be displayed on such devices are transmitted remotely according to a suitably-formatted CallerID-compatible signal transmitted to the email notification device 20 which, in turn, forwards the commands to the corresponding peripheral device in a suitable manner. In those embodiments described above in which the user notification parameter database 14c contains specialized parameter information, the user 18 may insert, modify, and delete such parameter information either through the central office 14 or ISP 16, which may provide a remote web, or other, interface for the user to enter the parameter information, or the parameter information may be entered by an agent of the central office or ISP in according to commands given to the agent by the user 18 via telephone, email, or other suitable communication means.

In yet another embodiment, the email notification signal may be facilitated through provision of a well-known stutter tone associated with the dial tone provided by the central office 14 when a telephone associated with the email notification device 20, e.g., a telephone coupled to the output terminal 22b of the email notification device 20, is "off-hook." In this manner, the user periodically removes the handset of the telephone to determine whether any unread email is stored on the user's email server, e.g., the ISP email server 16a. In such embodiments, the dial tone is preceded by a special stutter tone if there are any unread email messages stored on the user's email server. In some embodiments, the stutter tone is followed by a series of counting tones which indicate the number of unread email messages stored on the user's email server. In some embodiments, a special ringing signal is periodically provided to the user's telephone by the central office 14 or other suitable service provider to indicate that unread email messages are stored on the user's email server. In such an embodiment, after hearing the special ringing signal, the user may then lift the receiver of the telephone to hear a predetermined number of counting tones indicating the number of unread email messages stored on the user's email server. In other embodiments, a suitable monitoring device may be employed to periodically access the local loop telephone line to listen for the stutter tone and, if the stutter tone is present, the monitoring device activates an associated indicator light or other suitable notification means to indicate the presence of unread email messages stored on the user's email server. Preferably, the monitoring device listens for the subsequent counting tones and, if present, displays the corresponding number of unread email messages stored on the user's email server. Here, the counting tones may be DTMF or other suitable signals.

In still other embodiments, a conventional device which periodically logs on to a user's email server such as, for example, a WebTV device or standard email software operated in connection with a personal computer, may be configured in accordance with the present invention to await reception of an initiation signal as described above and transmitted by the central office 14 prior to logging onto the user's email server to check for any unread email messages stored thereon. Here, such devices may also be configured such that a predetermined number of email messages are to be received and stored on the user's email server before retrieving the email messages. This predetermined number may be stored by the central office 14 or other suitable server which sends the special ringing signal, stutter tone, or other notification signal to the user.

It should be noted that a user may utilize advantages of the present invention without owning or having access to a computer capable of an online connection. In such an embodiment, the user's telephone company or other information provider may maintain the user's email server, and may assign to the user a username which is a ten digit telephone number associated with the user. The server name may be the Internet address or fully qualified domain name operated by the telco or other service provider. For example, a subscriber having the telephone number (214) 123-4567 and having an email server having an Internet address of mailservice.com is alerted by sending an email message addressed to 2141234567@ mailservice.com. When the email server receives the email message, the email server accesses an associated lookup table or database to confirm that the user identified by the telephone number subscribes to the email notification service. If so, the email server sends a CallerID-compatible email notification signal as described above to the user via the local loop of the public switched telephone network. The email notification signal may contain all or a predetermined portion of the text of email messages stored on the email server, it may be merely an indication of the presence or number of such messages so that the user can use a computer located elsewhere to retrieve the actual message text, or it may be a voice message retrieved by the user which represents the text of the email after converting the email to text by well known text to voice processes. In some embodiments, information within the email notification signal message may be printed out at the user's situs via suitable printing means, which could also be used by banks or other businesses or individuals to provide invoices, bank statements, work orders, and the like to the useres in place of fax transmissions.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An email notification system for transmitting to a user an email notification signal indicating that email addressed to the user is received at an email server remote from the user, the system comprising:

a public switched telephone network having at least one local loop associated with the user;

at least one central office coupled to the public switched telephone network and coupled to the email server;

a CallerID server for routing the email notification signal to the user;

an email notification device coupled to the central office via at least one of the at least one local loop of the public switched telephone network, the email notification device receiving the email notification signal transmitted from the central office and, in response thereto, alerting the user as to the email addressed to the user; and the email notification signal representing alphanumeric data related to at least a portion of a text message of one or more email received on the remote email server.

2. The system of claim 1, wherein the central office is coupled to the remote email server via the Internet.

3. The system of claim 1, wherein the central office includes and operates the remote email server.

4. The system of claim 1, wherein the email notification device comprises an alert indicating means.

5. The system of claim 4, wherein the alert indicating means comprises a light-emitting device.

6. The system of claim 4, wherein the alert indicating means comprises a speaker.

7. The system of claim 4, wherein the email notification device further comprises a display means for displaying the number of email messages received on the remote email server.

8. The system of claim 4, wherein the email notification device further comprises a display means for displaying at least a portion of a text message of one or more email received on the remote email server.

9. The system of claim 1, wherein the email notification device comprises a microprocessor and associated memory.

10. The system of claim 1, wherein the email notification device includes an output terminal coupled to a telephone.

11. The system of claim 10, wherein the email notification device comprises a filter and signal splitting circuit to allow telephone voice calls to pass unmodified to the telephone.

12. The system of claim 1, further comprising a user notification parameter database for storing parameter information pertaining to the user and to the email server.

13. The system of claim 1, wherein the user notification database comprises one or more line entries corresponding to the user for storing an Internet address of the remote email server and an email username and/or password assigned to the user.

14. The system of claim 1, wherein the email notification signal is a CallerID compatible signal.

15. The system of claim 1, further comprising email query software for querying the remote email server at predetermined times to determine whether email addressed to the user is received by the remote email server.

16. The system of claim 15, wherein the email query software is maintained by the central office.

17. The system of claim 15, wherein the email query software is maintained by an information service provider remote from the user.

18. The system of claim 15, wherein a parameter value indicative of the predetermined time is stored within the user notification parameter database.

19. The system of claim 1, wherein the central office is coupled to the remote email server via the Internet.

20. A method of providing to a user a CallerID-compatible email notification signal indicating that email addressed to the user is received at a remote email server associated with the user, the method comprising the steps of:

transmitting a query signal to the remote email server;

transmitting, in response to the query signal, a preliminary email notification signal from the remote email server to a central office coupled to a public switched telephone network;

formatting the preliminary email notification signal into the CallerID-compatible email notification signal according to one or more parameter values; and transmitting the CallerID-compatible email notification signal from the central office to the user using the public switched telephone network.

21. An email notification device for receiving a CallerID-compatible email notification signal indicating the existence of unread email messages addressed to a user and stored on an email server associated with the user, comprising:

an input terminal coupled to receive the email notification signal transmitted from a CallerID server over a local loop of an associated public switched telephone network;

a microprocessor for processing the email notification signal;

a memory for storing information associated with the email notification signal;

an alert indicating means for alerting the user of receipt of the email notification signal; and the email notification signal representing alphanumeric data related to at least a portion of a text message of one or more email received on the remote email server.

22. The system of claim 21, wherein the email notification device further comprises an output terminal coupled to a telephone device.

23. The system of claim 21, wherein the alert indicating means comprises a light-emitting device and a speaker.

24. The system of claim 21, wherein the email notification device further comprises a display means indicating the number of unread email messages stored on the email server.

25. The system of claim 21, wherein the email notification device further comprises a display means for displaying a predetermined number of text lines associated with each of the unread email messages stored on the email server.

26. The system of claim 21, wherein the email server is remote from the user.

27. A method of notifying a user that an email message addressed to the user has been received by the user's email mail server, the method comprising the steps of:
- providing a CallerID server in operable connection with a local loop of a public switched telephone network;
- querying the user's email mail server to determine the presence or absence of any unread email messages stored thereon;
- transmitting, in response to the querying step and using the CallerID server, a CallerID-compatible email notification signal to a notification device operated by the user;
- selectively displaying information associated with the email notification signal on the email notification device; and
- the email notification signal representing alphanumeric data related to at least a portion of a text message of one or more email received on the remote email server.

28. The method of claim 27, wherein the email notification signal is transmitted to the user's email notification device during a silent interval between successive ringing signals of a CallerID-compatible signal.

29. An email notification system for passively receiving at a user's email notification device a CallerID-compatible email notification signal indicating the existence of unread email messages addressed to the user and stored on an email mail server associated with the user and connected to the Internet, the system comprising:
- a microprocessor having query software operating thereon for querying the email server to determine the existence of any unread email messages stored on the email serve and for generating a preliminary email notification signal in response thereto;
- a CallerID server connected to a public switched telephone network associated with the user for formatting the preliminary email notification signal into the email notification signal and for transmitting the email notification signal to the user via a local loop associated with the public switched telephone network and
- the email notification signal representing alphanumeric data related to at least a portion of a text message of one or more email received on the remote email server.

30. The email notification system of claim 29, wherein the public switched telephone network is a circuit switched network.

31. The email notification system of claim 29, wherein the public switched telephone network is a packet switched network.

32. The email notification system of claim 29, wherein the email notification signal is an analog signal.

33. The email notification system of claim 32, wherein the email notification signal is a digital signal.

\* \* \* \* \*